United States Patent [19]
Hunt

[11] Patent Number: 6,071,043
[45] Date of Patent: Jun. 6, 2000

[54] SYSTEM FOR SECURING LANDFILLS

[76] Inventor: James R. Hunt, 3 Dunwoody Park South, Suite 103, Dunwoody, Ga. 30338

[21] Appl. No.: 09/042,050

[22] Filed: Mar. 13, 1998

[51] Int. Cl.⁷ ........................................................ B09B 1/00
[52] U.S. Cl. ........................... 405/129; 405/270; 588/255; 588/259
[58] Field of Search ............................... 405/52, 53, 128, 405/129, 270; 588/249, 255, 259, 901; 210/901

[56] References Cited

U.S. PATENT DOCUMENTS

| | | | |
|---|---|---|---|
| 3,949,113 | 4/1976 | Draper et al. | 405/270 |
| 4,388,357 | 6/1983 | Luebke | 405/53 X |
| 4,464,081 | 8/1984 | Hillier et al. | 588/259 |
| 4,749,479 | 6/1988 | Gray | 210/901 |
| 4,908,129 | 3/1990 | Finsterwalder et al. | 405/129 X |
| 5,114,275 | 5/1992 | West et al. | 405/270 X |
| 5,161,915 | 11/1992 | Hansen | 588/249 X |
| 5,215,409 | 6/1993 | Jax et al. | 405/129 |
| 5,401,118 | 3/1995 | Kramer | 405/129 |
| 5,544,976 | 8/1996 | Marchbanks | 405/129 |
| 5,862,494 | 1/1999 | McDonnell et al. | 588/255 X |

*Primary Examiner*—George Suchfield

[57] ABSTRACT

The invention provides a method for securing waste landfills so as to prevent seepage of fluids into natural formations. A coating composition containing rubber crumb is sprayed onto polymeric liners enclosing the waste so as to encapsulate the ends or seams.

10 Claims, No Drawings

SYSTEM FOR SECURING LANDFILLS

FIELD OF THE INVENTION

The present invention relates to a liner for securing waste landfills and for preventing seepage of fluids into natural soil formations. More particularly, there is provided a novel non-leak membrane system for containing liquid waste by encapsulating with a coating composition containing rubber crumb.

BACKGROUND OF THE INVENTION

Landfills are used to contain all types of waste materials. Garbage waste contains noxious materials which can seep fluids that can contaminate underground streams and the neighboring environment. Incinerated waste can contain toxic substances which can leak if not properly contained. The U.S. Environment Protection Agency requires the use of landfill liners and cappers to keep the constituents of a landfill from seeping out or leaching into the ground.

U.S. Pat. No. 4,908,129 to Finsterwalder et al discloses an arrangement for retaining harmful substances from a waste dumping ground from leaching out. The arrangement comprises an impervious layer of mineral sealing materials, such as clay, with an adjacent layer containing materials capable of binding harmful substances by physical and/or chemical absorption. However, the problem is not solved in the event of heavy rain or flooding since the waste is not effectively sealed.

U.S. Pat. No. 4,388,357 to Luebke, which is herein incorporated by reference, discloses a liquid impervious liner capable of being packaged in a roll and adapted for use in an earthen reservoir for collecting fluids such as petroleum based oils. The liner consists of a layer of pervious non-woven polyester fabric which is secured to a layer of liquid impervious material, such as rubber having a thickness between 60 and 190 mils. However, there is no sealing at the ends.

U.S. Pat. No. 4,696,599 to Rakoczynski et al, which is herein incorporated by reference, discloses a hazardous waste landfill which contains a bottom liner of water impervious material, a liner overlaying the sub-base with seams to prevent leakage and a means for draining liquid. However, seams are not perfect and may break or be broken during installation or use.

The Environmental Protection Agency has taken the position that all landfills will leak, even those with the best liners. The reasons cited for the leaks are: 1) unsealed seams, 2) seams tend to delaminate after time, 3) movement of soil under the liner, and 4) holes are developed in the liner because of rough, not stable soil under the liner.

It would be advantageous to provide a system for completely sealing the liners in the event any of the above-mentioned occurrences take place.

SUMMARY OF THE INVENTION

The present invention provides an improvement in the system for securing landfills against liquid seepage which utilizes liners. According to the invention, an elastomeric coating is provided which covers and completely seals the system to form an encapsulated leakproof arrangement. A bottom liquid imperious polymeric liner is coated on at least one side with an elastomeric coating composition preferably containing deoiled and desulfurized rubber crumb such as prepared according to the process of U.S. Pat. No. 5,362,759 to Hunt et al, which is incorporated herein by reference. An elastomeric top liner is placed over the waste on the bottom layer and the top is then coated with the coating composition in an effective amount to encapsulate the waste and seal the ends or seams against leakage.

Advantageously, a plurality of layers of liners alternating with coating composition is utilized.

It is also advantageous to utilize for the liners polyvinyl chloride having a thickness of at least 0.5 mm.

It is further advantageous that the elastomeric coating is formed so as to be at least about 1.00 mm.

It is preferably that the rubber crumb is derived from scrap rubber tires.

DESCRIPTION OF THE PREFERRED EMBODIMENTS

Although specific terms are used herein to describe the preferred embodiments for the sake of clarity, it is to be understood that these terms are intended to refer only to the particular features for illustration only and are not intended to define or limit the scope of the invention.

Accordingly, the invention provides a system for securing waste containing landfills so as to prevent the seepage of liquids into the surrounding environment. According to an embodiment of the invention, the method comprising placing a polymeric bottom liner on the ground of a site of a landfill. The liner is then coated with an elastomeric coating composition containing rubber crumb. Optionally, the liner has on its bottom side a coating of the coating composition. Preferably, the coating formed is at least about 0.50 mm in thickness. If desired, depending upon the waste material, one or more additional coated polymeric liners may be provided.

The waste material is placed on the bottom liner and the waste material is capped by a polymeric liner. Preferably, the top liner is seamed to the bottom liner by sonic bonding, adhesives, fusion bonding, or the like.

The top liner is then coated with the coating composition so as to completely encapsulate the waste material within the liners. The coating composition is applied so as to close all openings upon curing.

The top liner may comprise one or more layers of polymeric material preferably alternating with a layer of coating.

The liners are at least about 0.5 mm in thickness and the coating at least about 5.0 mm in thickness, preferably 1.0 mm.

The liners can be of any flexible thermoplastic material which can be placed on the grounds of a landfill and conform to its geological form. The thermoplastic materials include polyvinyl chloride, polyvinyl alcohol, polyolefins such as polyethylene and polypropylene, nylon, and the like.

In accordance with the present invention, there is provided a coating composition for coating the liners and encapsulating waste materials to prevent liquid seepage. The composition contains about 2 to 60% by weight of rubber crumb having a mesh size of about 2 to 100. Preferably, about 2 to 10% of rubber crumb is utilized in the composition. The rubber crumb advantageously has been deoiled and desulfurized and is non-carbonized. Non-carbonized rubber crumb provides the composition and coating therefrom with good adhesion on a wide variety of substrates. The composition also contains about 20 to 60% by weight of a binder and water.

A preferred coating composition of the present invention which can be used in the invention comprises:

about 25 to 45% by weight of an acrylic latex, preferably about 30 to 40% by weight;

about 5 to 20% by weight of rubber crumb, said rubber crumb being non-carbonized, deoiled and desulfurized and having a mesh size of about 8 to 100;

about 5 to 20% by weight of water;

about 5 to 20% by weight of an inorganic filler; and about 0.1 to 4% by weight of a surfactant.

Optionally, there may be added fillers, thickeners and/or other materials which are conventionally utilized in coating compositions.

In addition to the aforesaid essential ingredients, other components such as disclosed hereinafter can be included in the composition, so long as they do not interfere with the curing process. Thus, for example, it may be desirable for a particular application, to include in the composition one or more of the following components: a wetting agent, a plasticizer, a leveling agent, a thixotropic agent, a flame retardant, an adhesion promoter, a stabilizer, or an inhibitor, all of which are commonly used in the formulation of coating compositions, to afford certain desired physical properties thereto. To further illustrate the various other additives that may be incorporated in the composition of the invention, the following is given:

Wetting agents: Examples of various wetting agents that can be used in the invention are: polyethylene glycol fatty esters, nonyl phenol ethylene oxide, fluorinated hydrocarbons, 2,2,3,3 tetrafluoropropylmethacrylate and acrylate, fluorinated alkyl polyoxyethylene ethanol, polypropoxy quaternary ammonium acetate, polymethylsiloxane, and ammonium salt of sulfated nonylphenoxypoly (ethyleneoxy) ethanol. The preferred wetting agents are fluorinated hydrocarbons. Fc-430 is the fluorinated hydrocarbon used herein that is soluble in the composition and, likewise, lowers the composition's surface tension.

Plasticizer: Examples of various plasticizer that can be used in the invention are: adipates, azelates, benzoates, epoxidized linseed oil, hydrocarbons, phosphates, polyesters, phthalates, trimellitates, aliphatic siloxanes, nonionic (polyethylene oxides), anionic (sodium lauryl sulfates), and cationic (cetyl pyridinium chloride). Those skilled in the art of formulating coating compositions will be able to select that particular plasticizer most suitable in any particular application. It will be appreciated, as earlier suggested, that use of such a component in any specific case is entirely optional and will depend upon the desired flexibility in the cured coating. For example, it may be desirable to include a plasticizer in a coating composition containing an epoxy acrylate resin, as such compositions, in general, will be found, on curing, to be relatively rigid.

Leveling Agents: Examples of various leveling agents that can be used in the invention are: sucrose benzoate, copolymer 2-ethylhexyl acrylate and ethyl acrylate, calcium stearate, and nonionic surface active agents.

Adhesion Promoters: Examples of various adhesion promoters that can be used in the invention are: dimethylaminoethyl acrylate and methacrylate, diethlaminoethyl acrylate and methacrylate, silanes, titanates, allyl ether of cyclic ureido, zircoaluminate, lignocellulosic, and thiodigylcol diacrylates and methacrylates.

The binders which can be used in accordance with the invention are dependent upon the type of coating. Thermoplastic or thermoset resins can be utilized.

Thermoplastic resins, for example, may include polyethylene, ethylenevinyl acetate copolymers, polypropylene, polystyrene, polyvinyl chloride, polyvinyl acetate, polymethacrylate, acrylonitrile-butadiene-styrene copolymers (ABS), polyphenylene oxide (PPO), modified PPO, polycarbonate, polyacetal, polyamide, polysulfone, polyether sulfone, polyolefins, polyacrylonitrile, polyvinylidene chloride, polyvinyl acetate, polyvinyl alcohol, polyvinyl pyrrolidone, ethyl cellulose, polyvinyl chloride vinyl acetate copolymer, polyacrylonitrile-styrene copolymer, polyacrylonitrile-vinyl chloride copolymer, carboxymethylcellulose, etc., polyparaxylene, polyamide, polyamide-imide, polyester imide, polybenzimidazole, polyoxadiazole, and the like.

Thermoset polymers are art-recognized and are extensively crosslinked polymers. Typically thermoset polymers are cured causing crosslinking forming a final coated product. The curing may be any type of curing which causes crosslinking including radiation, e.g., electron beam, catalyst, humidity or air curing. Thermoset polymer systems may include a polymer and/or prepolymer. The systems also may include additional agents which enhance the crosslinking process. Examples of thermoset polymers include the following:

phenol-formaldehyde
melamine-formaldehyde
urea-formaldehyde
polyurethane
unsaturated polyester
epoxy
phenolic anilin
furan
polyester
polyurethane
polyphenylene sulfide
polyamide
silicone
poly-p-phenylene benzobisthiazole
polyacrylate
polymethacrylate
novolac
phenolic
alkyd Other suitable resinous materials are disclosed in *Modern Plastics Encyclopedia,* 1984–85, Vol. 61, No. 10A, McGraw-Hill, New York, N.Y., which is herewith incorporated by reference.

The compositions disclosed herein include at least one surface active agent. Surface active agents are art-recognized components. The total amount of surface active agent(s) are preferably added to the composition in amounts ranging from about 0.5 and about 4% by weight of the composition. Such agents include various of those components that are variously referred to in the art as surfactants, dispersants or dispersing agents, emulsifiers, suspension agents and solubizers.

In some cases, the use of more than one surface active agents is preferred for best results. Silane, for example, does not, alone, provide maximum loading of fillers having a negative charge. Such fillers, e.g., calcium metasilicate (wollastonkup), disperse only to a certain loading, e.g, about 42% by weight of the composition, or 52% volume of filler, and above that loading, the filler tends to agglomerate. Nevertheless, when a different surface active agent or a second surface active agent, e.g., phosphate acid ester (such as GAFAC, RE-610), is added to the composition, the filler particles then disperse from one another, with attendant reduction in viscosity.

The surface active agent to be used can, if desired, be used to coat the filler particles prior to their introduction in the composition. Such a pretreatment of fillers is known, and silane treated fillers are available commercially. Moreover, where two surface active agents are desired in the composition, to obtain maximum loading and polymer properties, the use of a surface active agent coated filler will be found most advantageous.

Examples of surface active agents that can be used in the invention are:
- fish oil (one or more of oleic, palmitic and stearic acid)
- anionic polyelectrolyte
- linoleic acid
- oleic acid
- palmitic acid
- stearic acid
- carboxylic acid
- oleyl acids
- stearoyl sarcosine
- sodium salt of polycarboxyl
- anionic/nonionic surfactant blend
- fatty alcohol ethoxylates
- organic phosphate ester acid A preferred surface active agent is the quaternary ammonium salt Emco, CC-42. This surface active agent whose pH is neutral or slightly basic gives good dispersion with carbon black (Monarch 1,000) whose pH is 2.5 when introduced into the composition.

Other quaternary ammonium salts which are equally useful as dispersants are Emco: CC-9, CC-55, and the low molecular weight quaternary ammonium salts of methacrylic (acrylic) functionality, such as: BM-604, 2-trimethylammonium ethylmethacrylate chloride, or phosphate, or acetates; BM-613, N-trimethylammonium propylmethacrylamide chloride, or phosphates, or acetates; and BM-607, 2-trimethylammoniumethyl acrylate chloride, or phosphates, or acetates.

Stabilizers: Examples of various stabilizers that can be used in the invention are: 2-hydroxy-4-alkoxy benzophenones, 2(2 hydroxy phenyl) benzotriazole, salicylates, resorcinol monobenzoates, aryl or alkyl hydroxy benzoates, substituted oxanilides, substituted formamidine, 2,2 thiobis (4-octylphenolato)-n-butylamine nickel II, nickel salts of thiocarbamate, alkylated phenol phosphonate nickel, and tetramethyl pyperidine. Such compounds will be used as necessary to increase the pot life of the coating composition.

Inhibitors: Examples of various inhibitors that can be used in the invention are: hydroquinone, p-methoxyphenol, alkyl and aryl-substituted hydroquinones and quinones, tert-butyl catechol, pyrogallol, octadecyl-B-(hydroxy-3,5-di-t-butyl phenyl)-propionate, 2,6-di-tert-butyl-4-methyl phenol, phosphorous acid, beta-naphthol, 2,6-di-tert-butyl p-cresol, 2,2-methylene bis(4-ethyl-6-t-butylphenol), p-toluquinone, aryl and alkyl phosphites, and benzotriazoles. Addition of such components to the compositions of this invention will increase the shelf life, as desired.

Those skilled in the art of formulating coating compositions can readily determine the amounts of such optional additives, to be added to any particular composition of our invention, for any particular application and desired property. Such materials are, in general, present in the compositions in very minor concentrations, ranging from less than 5% by weight of the polymer composition, and usually less than 3% by weight of the polymer compositions. In any event, such additives are not included in any significant amount whereby the additives do not interfere with the cross-linking of the polymeric material or to lessen the good properties desired, and achieved, in the cured coating.

Some of the suitable inorganic fillers include calcium carbonate, calcium silicate, titanium oxide, aluminum oxide, talc, clay, alumina, calcium hydroxide, magnesium carbonate, fumed silica, and the like.

Some of the organic fillers which may be used include powdered Teflon, melamine, melamine formaldehyde, carbon, black, and the like.

Examples of various flame retardant that can be used are tetrabromo disphenol, A-diacrylate, methyl pentachlorostearate, bis (tribromo-phenoloxy) ethane, aluminum trihydrate, antimony oxide, phosphates, zinc borates and barium metaborates.

The following examples further illustrate the present invention.

EXAMPLE I

A coating composition was prepared as follows:

Step A.

The following ingredients were admixed in a stainless steel vat with a high speed Banbury mixer.

| Ingredient | lbs/gal |
|---|---|
| Water | 111.7 |
| Acrylic latex binder | 114.3 |
| Ethylene glycol | 25.0 |
| Carboxy cellulose | 3.4 |
| Non-silicone defoamer | 3.8 |
| Surfactant (KTPP) | 1.5 |
| Zinc oxide | 57.1 |
| Titanium dioxide | 85.1 |
| Crumb rubber (8–100 mesh) | 550.0 |

The mixture was mixed at high speed for 15 minutes.

Step B.

To the composition of Step A was added with mixing the following mixture of ingredients.

| Ingredient | lbs/gal |
|---|---|
| Acrylic latex binder | 322.0 |
| Surfactant | 8.0 |
| Mildewade | 2.0 |
| Ammonium hydroxide | 6.5 |

The above composition can be sprayed, painted and rolled onto a liner and applied as one or more layers as required. If desired additional fire retardancy compositions (about 2–5%) may be added into the composition in either the composition of Step A or B.

EXAMPLE II

A landfill site is secured according to the following steps.

The site is prepared by leveling and a base of sand is put down. Over the sand was placed a bottom liner of polyvinyl chloride having a thickness of 0.5 mm which is available from Philips Petroleum Company of Stanley, S.C. The liner is spray coated with the coating composition of Example I so as to form a coating of about 1.0 mm. A second liner of polyvinyl chloride is placed over the coating on the first liner and the second liner is sprayed with the coating composition of Example I.

Incinerator ash is placed on the bottom layers and a capping layer of polyvinyl chloride is placed over the waste.

The layers are then seamed by a high temperature, pressure controlled split wedge welder which creates an air channel running between two parallel welds. The top or capping layer is then sprayed with the composition of Example I so as to form a coating of about 1.0 mm over the top liner and the seams. The system is now secured against any leakage of fluids.

What is claimed is:

1. In a method for securing a landfill containing waste materials wherein a bottom liner and a top liner of flexible polymeric water impervious material is utilized, the improvement which comprises the steps of:
   A) providing in said landfill a bottom liner having on at least one side a coating of an elastomeric coating composition containing rubber crumb;
   B) placing waste material on said bottom liner;
   C) providing a top liner so as to cover said waste material, and then
   D) coating said top liner with an effective amount of said coating composition so as to seal and encapsulate said waste material between said bottom and top liners.

2. The process of claim 1 wherein said bottom liner is coated on both sides with said coating composition.

3. The process of claim 1 wherein said top liner is coated by spraying said coating composition onto said top liner.

4. The process of claim 1 wherein said bottom liner comprises a plurality of layers of polymeric material.

5. The process of claim 1 wherein said bottom liner comprises polyvinylchloride.

6. The process of claim 1 wherein said rubber crumb is derived from scrap rubber.

7. The process of claim 1 wherein said rubber crumb is desulfurized and deoiled.

8. The process of claim 1 wherein said liners have a thickness of at least 0.5 mm.

9. The process of claim 1 wherein said top liner and said bottom liner are seamed together.

10. The process of claim 1 including a layer of liquid absorbing material on said bottom layer.

* * * * *